United States Patent [19]
McClelland

[11] Patent Number: 5,893,205
[45] Date of Patent: Apr. 13, 1999

[54] ROTOR FOR A RELUCTANCE MACHINE, AND METHOD OF MAKING

[75] Inventor: Michael Leo McClelland, Calverley, United Kingdom

[73] Assignee: Switched Reluctance Drives Limited, North Yorkshire, United Kingdom

[21] Appl. No.: 08/790,378

[22] Filed: Jan. 29, 1997

[30]   Foreign Application Priority Data

Feb. 21, 1996 [GB] United Kingdom ............ 9603668

[51] Int. Cl.⁶ ............................................. H02K 15/02
[52] U.S. Cl. ........................... 29/598; 310/42; 310/261
[58] Field of Search ............................. 29/598; 310/42, 310/261

[56]        References Cited

U.S. PATENT DOCUMENTS 4,434,546  3/1984  Hershberger ............................. 29/598
4,888,513  12/1989 Fratta .
5,176,946  1/1993  Wieloch ................................... 29/598

FOREIGN PATENT DOCUMENTS 0771669  4/1957  United Kingdom .
0940997  11/1963 United Kingdom .
1054924  1/1967  United Kingdom .

*Primary Examiner*—Timothy V. Eley
*Assistant Examiner*—Benjamin Halpern
*Attorney, Agent, or Firm*—Patterson & Keough, P.A.

[57]            ABSTRACT

A reluctance motor rotor is formed by sandwiching a stack of thin ferromagnetic laminations between two end caps. Each lamination has a series of slots formed in it, with the ferromagnetic material between these slots providing a flux guide. A rib is formed around the periphery of each lamination, thereby enclosing the slots. The slots are then filled with an epoxy resin through holes in the end cap. The resin, which is initially in the liquid state, is then cured in an oven. Once the resin is hard, the outer rib can be machined off to expose the resin. A rotor formed in this manner exhibits significantly higher output than prior art rotors of similar dimensions using magnetic bridges, and is relatively cheap to produce.

21 Claims, 7 Drawing Sheets

ROTOR FOR A RELUCTANCE MACHINE, AND METHOD OF MAKING

BACKGROUND OF THE INVENTION

1. Field of the Invention

This invention relates to a method of forming a rotor for a reluctance machine and particularly, but not exclusively, a rotor for a synchronous reluctance machine.

2. Description of Related Art

A typical prior art synchronous reluctance machine is shown schematically in cross section in FIG. 1. The motor consists of a stator 10, onto which are wound three-phase, sinusoidally distributed, windings 20, 30, 40 in slots. Although only one conductor of each winding is shown in FIG. 1, it will be understood that a practical motor consists of many such conductors distributed in the slots around the stator. Those conductors in adjacent slots, and connected in the same electromagnetic phase, are known as a phase band. The conductors shown in FIG. 1 are each at the center of their respective phase bands.

A two-pole salient rotor 45 is mounted co-axially with the stator 10 on a shaft 48. The stator 10 and rotor 50 are typically constructed from thin laminations of magnetically permeable iron, the planes of lamination being normal to the shaft.

Torque is produced by supplying the three phase windings 20, 30, 40 of the motor of FIG. 1 with sinusoidal currents which have a phase displacement in time, with respect to each other, of 120°. The varying flux generated by the stator 10 causes the rotor poles to move as they attempt to maintain a position of minimum reluctance in the changing magnetic field.

The variation of stator winding current in time may be represented as a rotating phasor. The current in each winding sets up a magnetomotive force (MMF) which is sinusoidally distributed in space around the air gap between the stator 10 and rotor 50 and has a wavelength equivalent to the circumferential distance between the center of each phase band. Thus, a wave of MMF is produced which travels one pole pitch in one half cycle of the supply frequency.

The MMF vector acts on the permeance of the non-uniform air gap to produce a corresponding flux-linkage vector. This flux-linkage vector urges the salient rotor poles into a position of minimum reluctance. It is this tendency of the rotor to align itself with the flux-linkage vector which gives rise to the motor torque which is the output of the rotor.

As indicated by the broken lines D and Q in FIG. 1, there are direct and quadrature axes of the motor, the quadrature axis being 90 electrical degrees from the direct axis. In order to maximize the performance of a synchronous reluctance motor, it is preferable that the difference in the reluctance of the magnetic circuit when the rotor is in the maximum and minimum reluctance positions is as great as possible.

A number of other parameters can be considered in the construction of a synchronous reluctance motor in order to enhance dynamic performance. In particular, the rated output, i.e. the torque that the motor can produce continually for a given temperature rise, should be maximized. Also, it is desirable to limit the amount of torque ripple in the output of the motor. Torque ripple is the variation of output torque as a function of rotor position, which acts upon the rotor inertia causing a corresponding rotor speed variation.

It is known to improve the output of the motor by flux-guiding the rotor. FIG. 2 shows a radial lamination profile of a typical rotor with flux guides 50. The flux guides usually consist of a set of areas of lamination material extending around a segment of the rotor, each flux guide being bounded by a region of relatively low magnetic permeability known as a flux barrier 52. There may be a plurality of such sets of flux guides spaced radially across the rotor, the flux guides in each set being radially separated by flux barriers. It will be seen in FIG. 2 that the flux barriers 52 extend from one rotor pole region 54 into an interpolar region 56. Adjacent flux barriers are separated by a thin inner magnetic bridge 58.

Each flux barrier is terminated in a peripheral magnetic bridge 60. On the one hand, the bridges 58 and 60 should be as thin as possible. The thinner they are, the more limited is the magnetically distorting effect they have on the flux paths defined by the flux guides. The bridges are designed to saturate quickly, and while their magnetic effect as a flux path where one is not wanted is small, it is non-negligible. Ideally, they should not be present at all but they have been considered necessary in the past to keep the lamination in one piece during and after the rotor assembly process. Thus, there is a limit on how thin the bridges can be in order for them to be sufficiently mechanically rigid.

Some stress relief has been effected by forming the radially peripheral ends of the flux barriers with a radius. The prior art rotor lamination of FIG. 2 embodies an acceptance of the need for magnetic bridges in the finished rotor as an essential mechanical feature of the rotor assembly process. Axially laminated rotors are also known, e.g. from U.S. Pat. No. 4,888,513 (Fratta), which is incorporated herein by reference. A typical cross-section of an axially laminated rotor is shown in FIG. 3. The laminations 62, 64, 66 are generally channel-shaped and the laminations lie parallel to the shaft, hence the term 'axially laminated'.

An axially laminated rotor may be considered as a flux-guided rotor where the number of sets of flux guides is high, and the radial width of each set of flux guides and associated flux barriers becomes consequentially small.

Each of these techniques has problems. Rotors with a small number of flux guides are relatively simple to produce, since they can be made from punched, radial laminations. In order to provide the required amount of mechanical rigidity, however, and to allow the ferromagnetic flux-guides to be connected to the rotor core, saturating magnetic bridges must be incorporated. These significantly increase the quadrature axis inductance, leading to motor performance degradation.

British Patent No. 1054924, which is incorporated herein by reference, is concerned with providing a method of construction to attempt to overcome the difficulties of the saturating magnetic bridges. It shows a rotor lamination having salient pole portions and circumferential pole portions, initially linked by bridging sections. The spaces between the portions are filled with conducting metal, forming a cage which assists in holding the portions together. However, this cage has an adverse effect on the losses of the rotor. The bridging sections are then removed by milling to avoid any increase in quadrature axis inductance, but this is both a difficult and time consuming exercise.

The milling operation to remove the bridges is also intrusive. In many applications the rotor is designed to rotate at a rate at which the windage on a non-circular section can become significant. Thus, the recesses left after the milling operation are often filled in with a filler material, such as a curable resin. However, the radial forces imposed on the filler are high. The filler is only able to rely on its adhesion to the metal of the rotor to stop it being forced out at speed.

3

Axially laminated rotors are seldom used because of the extreme difficulty of manufacture and of ensuring stability of the assembly during the lifetime of the machine. It will be seen from FIG. 3 that each lamination has a geometry different from the adjacent ones. This implies a very involved manufacturing process. Then there is the difficulty of securing each bundle of laminations to the central rotor core in a stable and secure way. Although there are several methods of doing this, all are complex and expensive. Even when the rotor is complete, it is usually limited in top speed and dynamic performance because of its construction.

SUMMARY OF THE INVENTION

It is an object of the present invention to provide a rotor and a method of forming a rotor for a reluctance machine which at least alleviates these problems of the prior art.

According to embodiments of the invention, stack of laminations provides a set of flux barriers, initially held in place by circumferential ribs, able to accept a settable substance. When the substance has set in the stack, the ribs are removed so that the separate parts of the rotor are held together by the substance and not by magnetic bridges. The removal of the ribs leaves clean edges on the separate flux guides so that the angular extent of each rotor pole at its radially outer face is clearly and reliably definable.

The rotor made according to embodiments of the present invention has been found to have a significantly higher rated output than the corresponding prior art rotor because it is possible to avoid using magnetic bridges. In addition, it is cheaper to produce than an axially laminated rotor. In contrast to the segmental pole rotor of British Patent No. 1054924, the filler holding the flux guides in position can be non-conducting and provides mechanical rigidity without the adverse effects associated with the conducting cage.

BRIEF DESCRIPTION OF THE DRAWINGS

The present invention can be put into practice in various ways some of which will now be described by way of example with reference to the accompanying drawings in which.

DETAILED DESCRIPTION OF PREFERRED EMBODIMENTS

Figure 1:
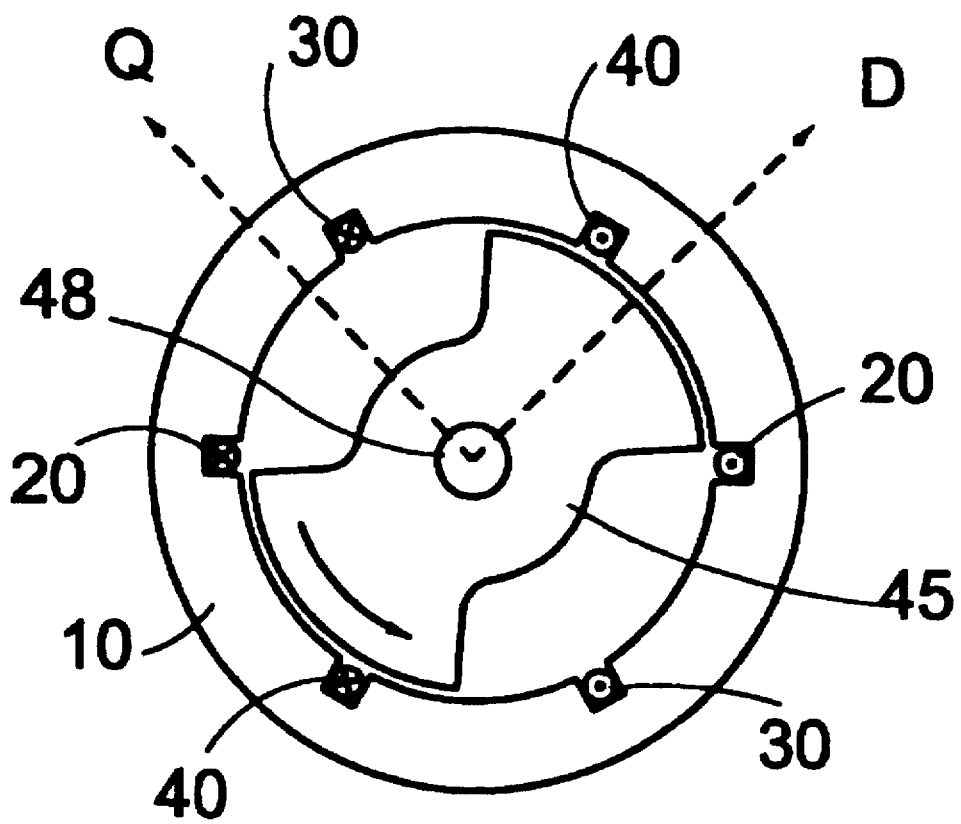
FIG. 1 shows a prior art synchronous reluctance motor.
Figure 2:
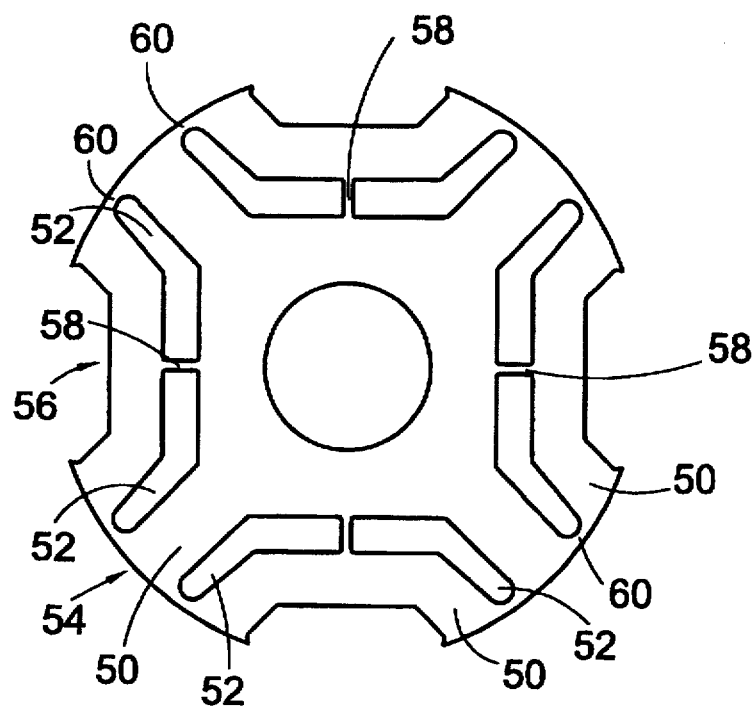
FIG. 2 shows a prior art flux-guided rotor.
Figure 3:
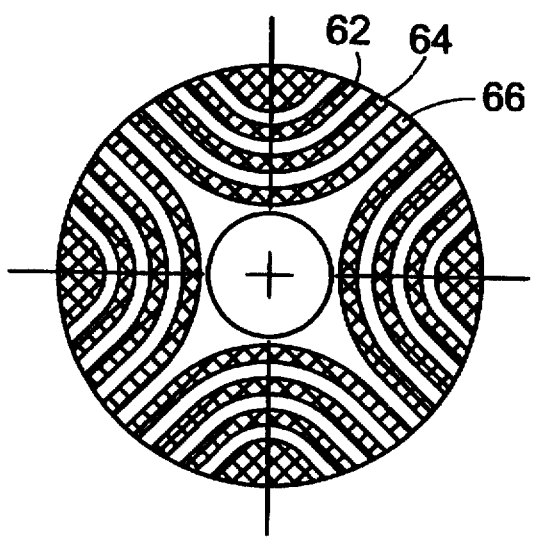
FIG. 3 shows the typical construction of a prior art axially laminated rotor.
Figure 4:
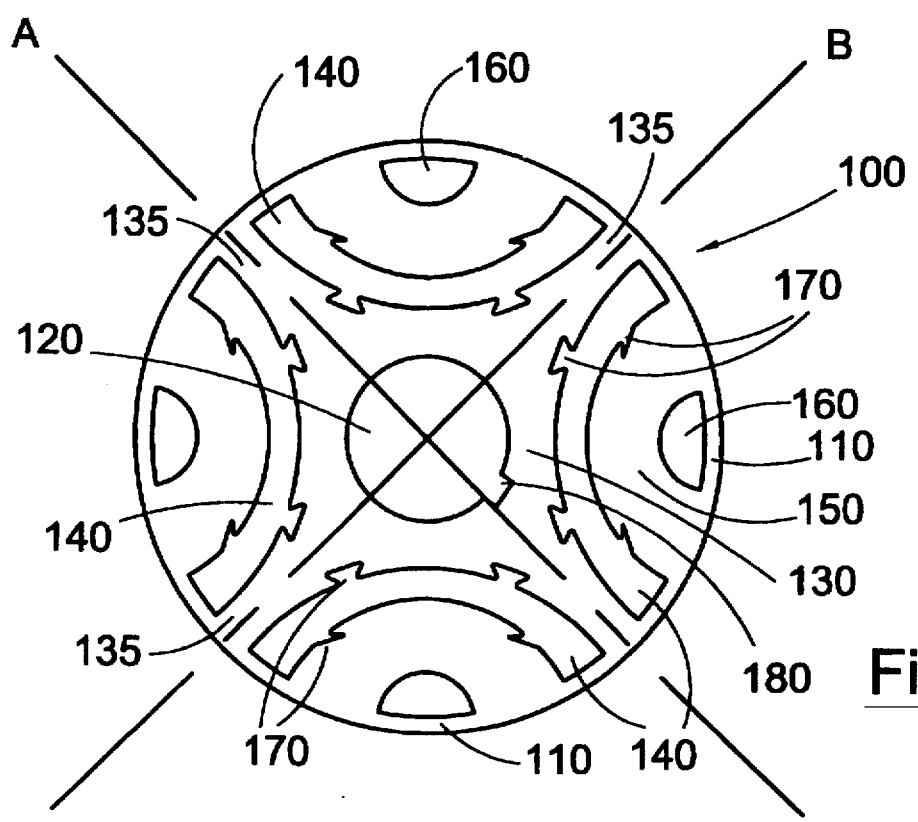
FIG. 4 shows a plan view of a lamination of a partially-formed rotor according to a first embodiment of the present invention.

Referring to FIG. 4, a lamination 100 suitable for constructing a rotor for a reluctance motor is shown. It will be understood that each lamination 100 is relatively thin, e.g. about 0.65 mm, since it is desirable that it be produced by stamping or by laser cutting from electrical sheet steel, e.g. Newcor 800-65 produced by Orb Electrical Steels, UK, or a similar ferromagnetic material of suitable magnetic qualities. The rotor comprises a stack of such laminations modified in accordance with FIG. 5 after assembly in a manner which will be set out below.

The pole geometry of each lamination 100 is symmetrical about two axes A and B arranged normally, and consists, radially, of five general regions. The first of these is the circular hole 120, bearing a cut-out defining a key way 180, in the center of the lamination 100. The hole allows a rotor shaft to pass through it, to which the stack of laminations is keyed. The second region is the core part 130 of the lamination in which the hole 120 is defined and from which extend central flux guides 135. The third regions comprise four generally arcuate spaces, extending almost to the circumference of the lamination 100. The spaces form flux barriers 140, which will be discussed in more detail below, spaced equidistantly around the lamination 100.

The fourth radial regions comprise four flux guides 150, which are also generally arcuate. Each flux barrier 140 is defined between the central flux guide 135 and each outer flux guide 150. Finally, the fifth regions comprise four channels 160 which are also flux barriers defined by the outer edge of each outer flux guide 150.

A rib 110 is formed spanning the radially outer edges of all the flux barriers to maintain the flux guides 150 and the core part in their relative positions. As will be described, the rib 110 is subsequently removed to achieve the final form of the rotor. The rib 110 can be considered as a radially outer ring which is machined off. As such, each part of the rib actually spanning the flux barriers is an arcuate piece coaxial with the axis of the hole 120. In an alternative form each rib projects radially beyond the rest of the lamination. In this form machinery does not have to remove anything but the ribs although it may be desirable to skim off the radially outer edge of the whole lamination to achieve improved concentricity.

Notches 170 are formed in the edges of the portions of the flux guides defining the flux barrier 140. These notches provide 'keys' which allow a stronger bond to be obtained between the settable substance and the lamination.

Figure 5:
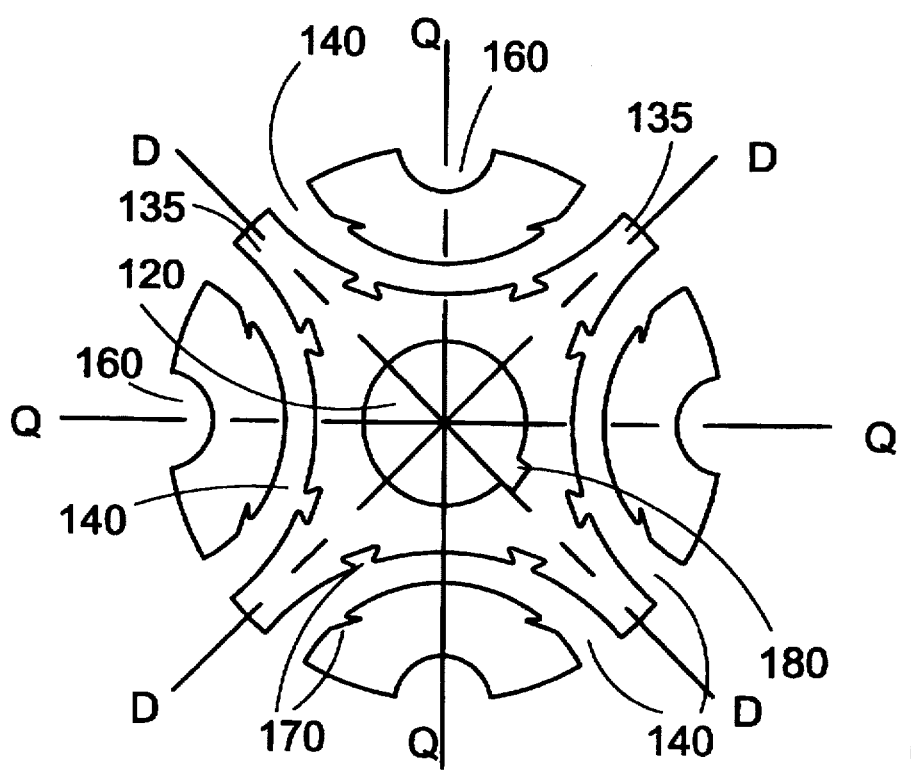
FIG. 5 shows a plan view of the rotor formed from the laminations of FIG. 4, each lamination having its outer rib removed.

FIG. 5 shows a section through the lamination as it is in the assembled rotor, as will be described further with reference to FIG. 6. The rib 110 has been machined off, and the broken lines D and Q define the direct and quadrature axes of magnetization of the rotor, respectively. The rotor of FIG. 5 constitutes a 4-pole rotor such as may be employed in a reluctance machine. The four rotor poles are equi-angularly spaced about the axis of the hole 120. For ease of reference in the following description, each region of the rotor centered around a direct axis D of magnetization is called a pole.

Figure 6:
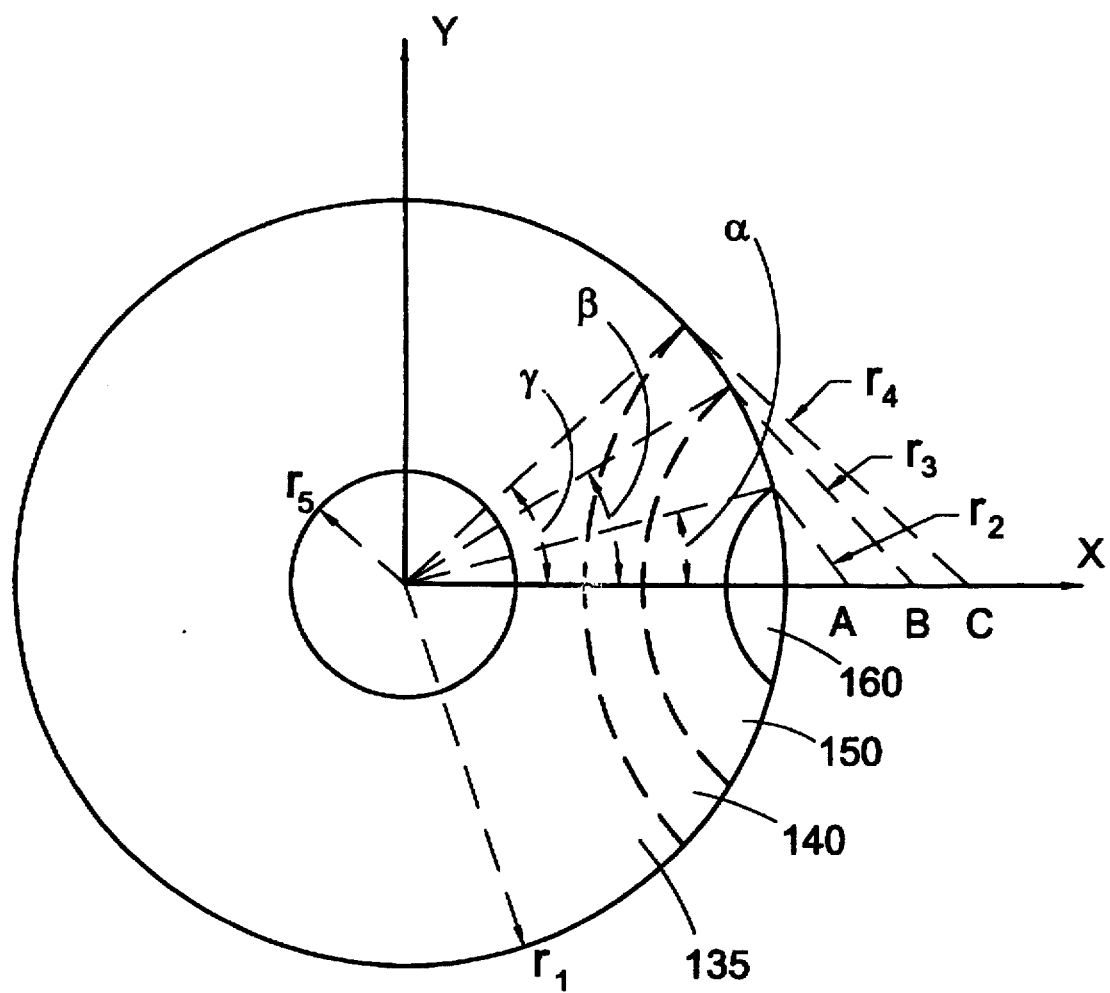
FIG. 6 shows the geometric arrangement of the features of the rotor of FIG. 5.
Figure 10:
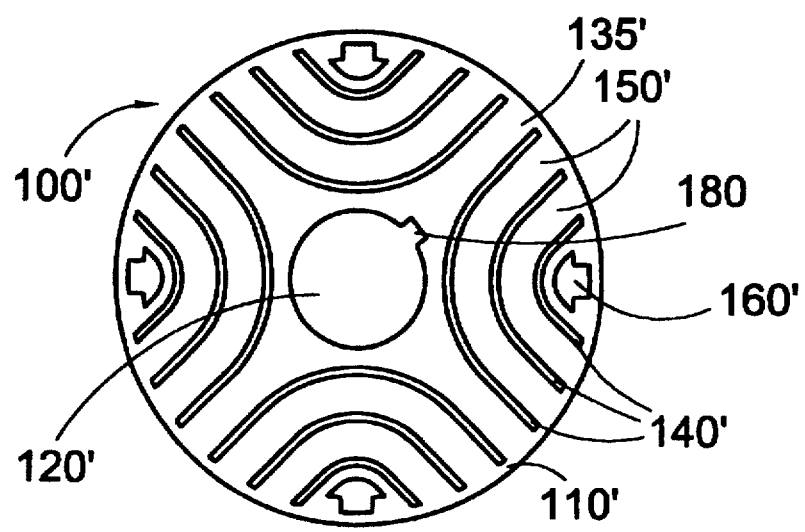
FIG. 10 shows a plan view of a lamination of a partially formed rotor according to a second embodiment of the present invention.
Figure 11:
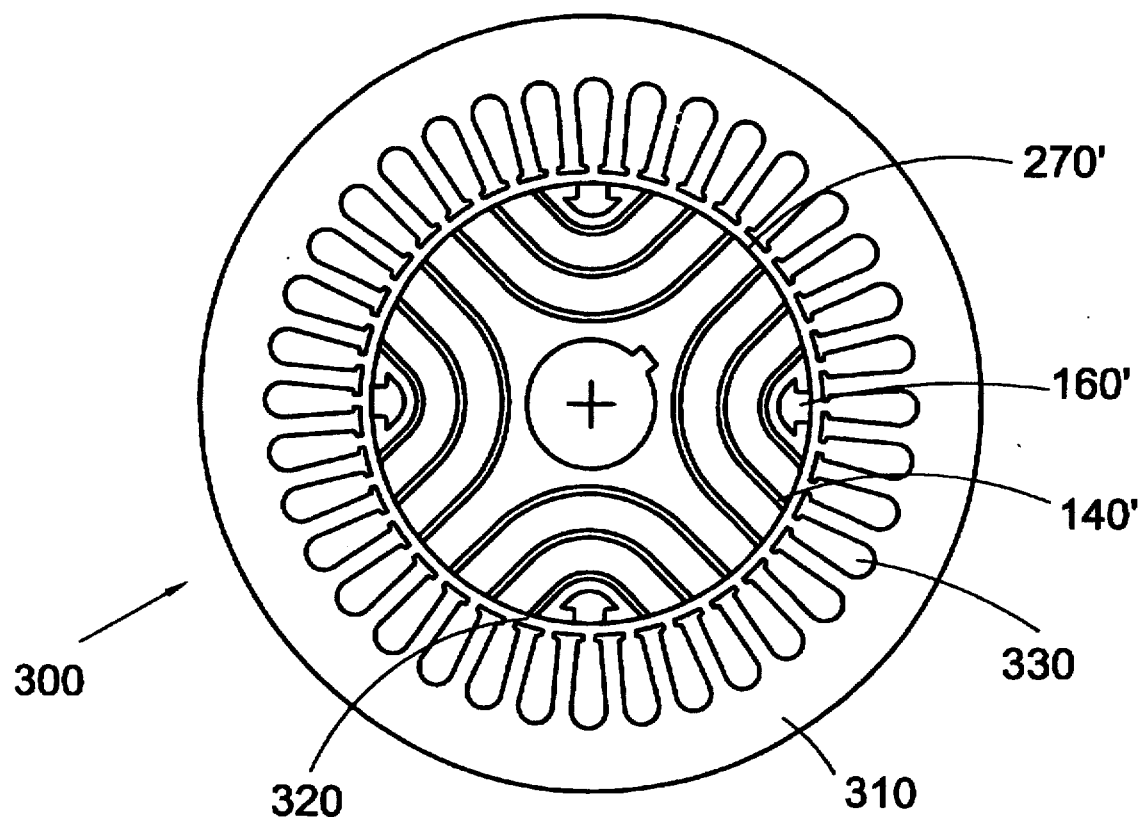
FIG. 11 shows a plan view of a reluctance motor including a rotor, the rotor formed from the laminations of FIG. 10, each lamination having its outer rib removed.

Turning now to FIG. 6, a schematic diagram of the rotor section of FIG. 5 is shown, setting out the geometric relationship between the five regions discussed in connection with FIG. 4. Only one flux barrier 140 and channel 160 are shown for the sake of clarity. Further, although the embodiment described with reference to FIG. 6 utilizes only a pair of outer flux guides 150 per rotor pole, a plurality of narrow flux guides spaced radially from each other will improve the motor performance further. One such embodiment is shown in FIGS. 10 and 11. The use of multiple flux guides allows a greater area of magnetic steel to be presented at the rotor surface, thus increasing the maximum inductance (on the D axis) while maintaining a sufficiently high value of reluctance across the flux barrier that the minimum inductance (on the Q axis) is kept low. The net result is that the difference between the maximum and minimum inductances is increased, leading to greater torque production.

The flux-barrier 140 is defined on one side by the central flux guide 135 and, on the other, by the outer flux-guide 150. In this embodiment the radially inner periphery of the central flux guide 135 defining the flux barrier (with respect to the rotor axis) is defined by a circle of radius $r_4$ and center C. The periphery of the flux guide defining the flux barrier 140 is defined by another circle of smaller radius $r_3$ and a center B radially inside the center C. The surface of the channel 160 is defined by a third circle of still smaller radius $r_2$ and a center A which is radially inside the center B.

Once the rib 110 has been removed to form the profile shown in FIG. 5, the radius of the lamination stack forming the rotor is $r_1$. Then the following relationships exist between the various radii and the centers A, B and C:

$$r_2 = r_1 \tan \alpha$$

$$OA = r_1 / \cos \alpha$$

$$r_3 = r_1 \tan \beta$$

$$OB = r_1 / \cos \beta$$

$$r_4 = r_1 \tan \gamma$$

$$OC = r_1 / \cos \gamma$$

where $\alpha$, $\beta$ and $\gamma$ are the angles subtended between the X-axis through the axis center O on which the centers A, B and C are disposed, and the point where the flux guide 150, the inner radius and outer radius of the flux barrier 140 meet the circumference of the rotor profile in FIG. 5, respectively. O is the centre of the rotor.

Figure 7:
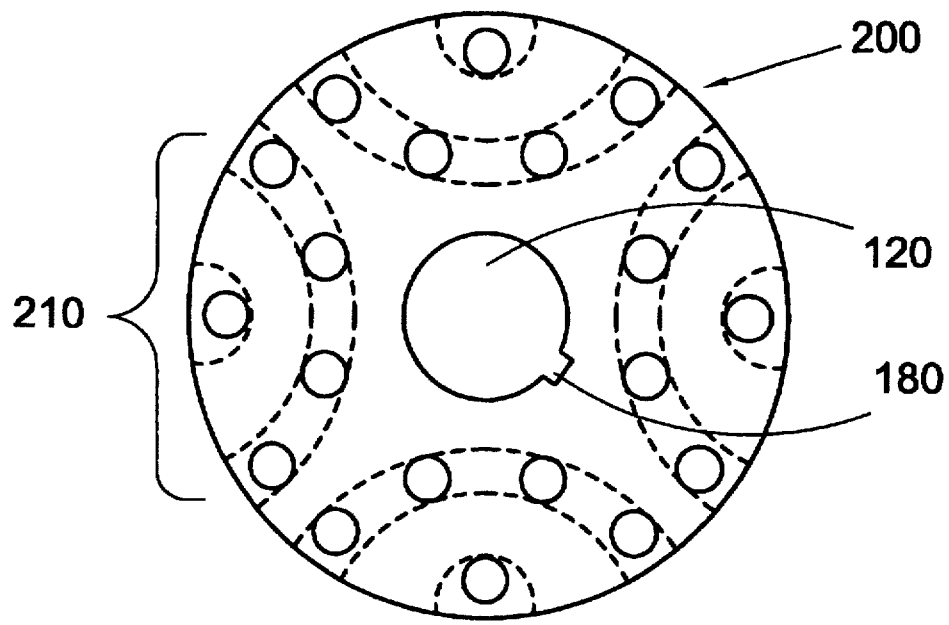
FIG. 7 shows a plan view of an end cap for the rotor of FIG. 5.
Figure 8:
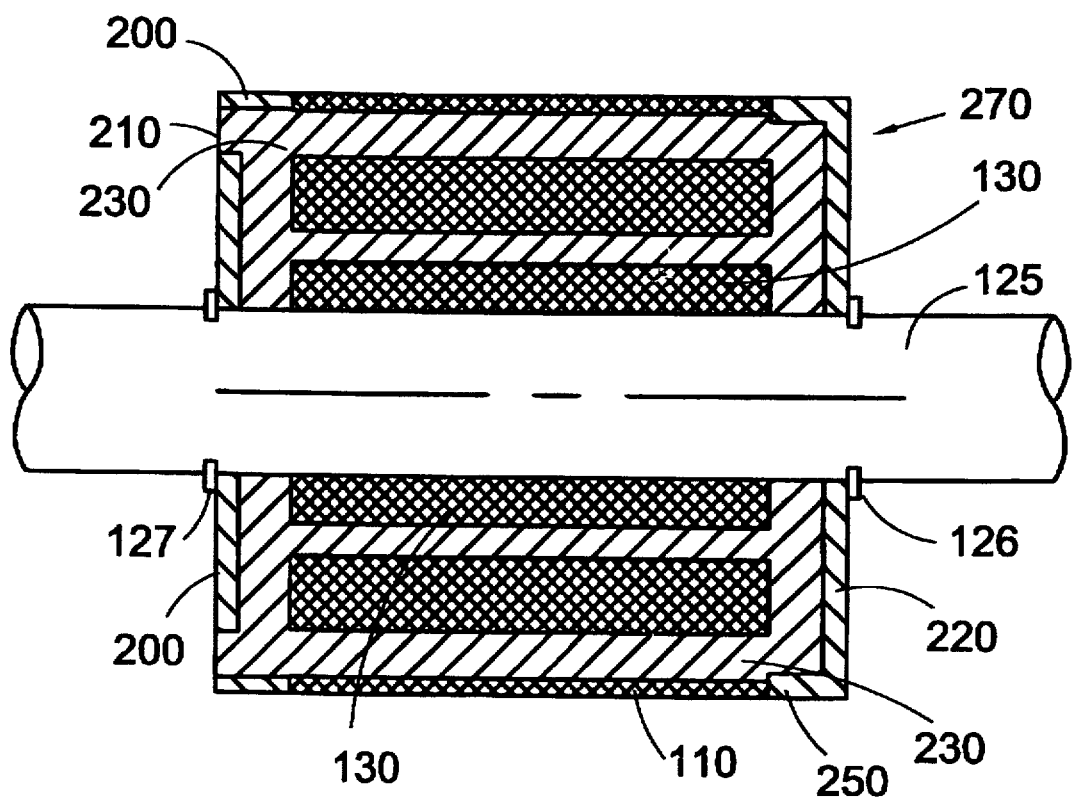
FIG. 8 shows a section through the assembled rotor comprising the partially formed laminations.

FIG. 7 shows a first end cap 200 for the rotor comprising the stack of laminations 100. It is made from a chemical and heat resistant material such as stainless steel. Austenitic chromium nickel steel is particularly suited to this application, being resistant to rust, acid and heat. Four sets of holes 210 are formed in the end cap 200. The arrangement and purpose of the holes will be described below with reference to the construction of the rotor shown in cross section in FIG. 8. An axial hole 120 and cut out 180 are formed, corresponding to the lamination shown in FIG. 4.

A second end cap 220, having an axial hole and a cut out only (i.e. without the holes 210 shown in the end cap of FIG. 7), is slid onto a rotor shaft 125 to abut a circlip 126. Each end cap has a peripheral skirt extending axially toward the other end cap, as may be seen at 250 in FIG. 8.

A suitable number of the laminations 100 of FIG. 4 are placed in a stack and aligned axially. The stack of laminations 100 is then placed on the shaft 125 and slid along it until the stack abuts the rib of the second end cap 220. The laminations have the cut-outs which, together with a slot formed in the shaft, define the keyway. A key is positioned in the keyway to prevent rotational movement of the laminations relative to the shaft in a known manner. The first end cap 200, having the series of holes 210 formed in it, is then placed on the shaft and arranged to rest against the stack of laminations. From FIG. 7 the orientation of the sets of holes in registry with the flux barriers and the channels will be apparent.

The assembled stack is then subjected to a compressive pressure of between 25000 and 50000 kg/m² in the axial direction, and the location for a recess for receiving a second retaining circlip 127 is marked on the rotor shaft above the first end cap 200. It is important that the compressive force is not excessive, as this can degrade the magnetic properties of the individual laminations. To complete the assembly, the second retaining circlip is located onto the shaft in a recess formed in the marked position.

Once the rotor has been assembled, it is potted by introducing a settable substance 230 into the spaces of the flux barriers and the channels through the holes 210 in the first end cap to completely encase the rotor assembly. The flowing substance travels along the holes 210 and meets in the gallery defined by the second end cap 220. In order to minimize induced eddy currents and consequent loss of efficiency, a low permeability, electrically non-conducting material is preferred as a potting material. Particularly suitable is a two-part, heat cured epoxy resin, e.g. Scotchcast Brand Electrical Resin 251 produced by 3M Industrial Electrical Products Limited, UK. This has a very low viscosity when warmed above room temperature, thus allowing thorough penetration into the small recesses of the narrow flux barriers and the notches 170. This resin also has a high mechanical and adhesive strength once cured, which is essential in supporting the flux-guides against high radial and magnetic forces.

It will be apparent that the potting process introduces the resin so that the laminations are held together. While in this embodiment the flux barriers are all filled with the settable substance, it will be apparent that only selected flux barriers may be filled or filled sufficiently to hold the stack together.

Although epoxy resin is preferred for the reasons outlined above, other materials such as aluminium could be cast into the spaces in the rotor assembly instead. Any resultant increased motor energy loss is partly compensated for by the substantially increased mechanical strength that the aluminium would provide.

In the preferred potting process, epoxy resin is mixed, heated and poured into the rotor assembly, which has also been pre-heated, through the holes 210 in the first end cap 200. Since the end caps and the lamination stack have been compressed, and each individual lamination has the rib 110 at its circumference, the resin is effectively constrained within a mold. Preheating the resin and rotor assembly assists in the removal of air bubbles by keeping the resin at a low viscosity. Nevertheless, it may sometimes be desirable to subject the assembly to a vacuum, to allow further de-aeration of the resin, particularly if the diameter of the rotor assembly (and, consequently, the spaces within it) is small, or there are multiple flux guides per pole.

It will be apparent that the end caps allow a resin-tight mold to be formed, whereas the ribs 110 also serve to hold the magnetizable parts of the rotor together. It may be desirable to replace the end caps by a suitable mold assembly which does not form part of the final rotor. In particular, the separate mold assembly may form part of the machine used to inject or pour the resin into the lamination stack, to speed up or reduce the cost of manufacture of the rotor.

Figure 9:
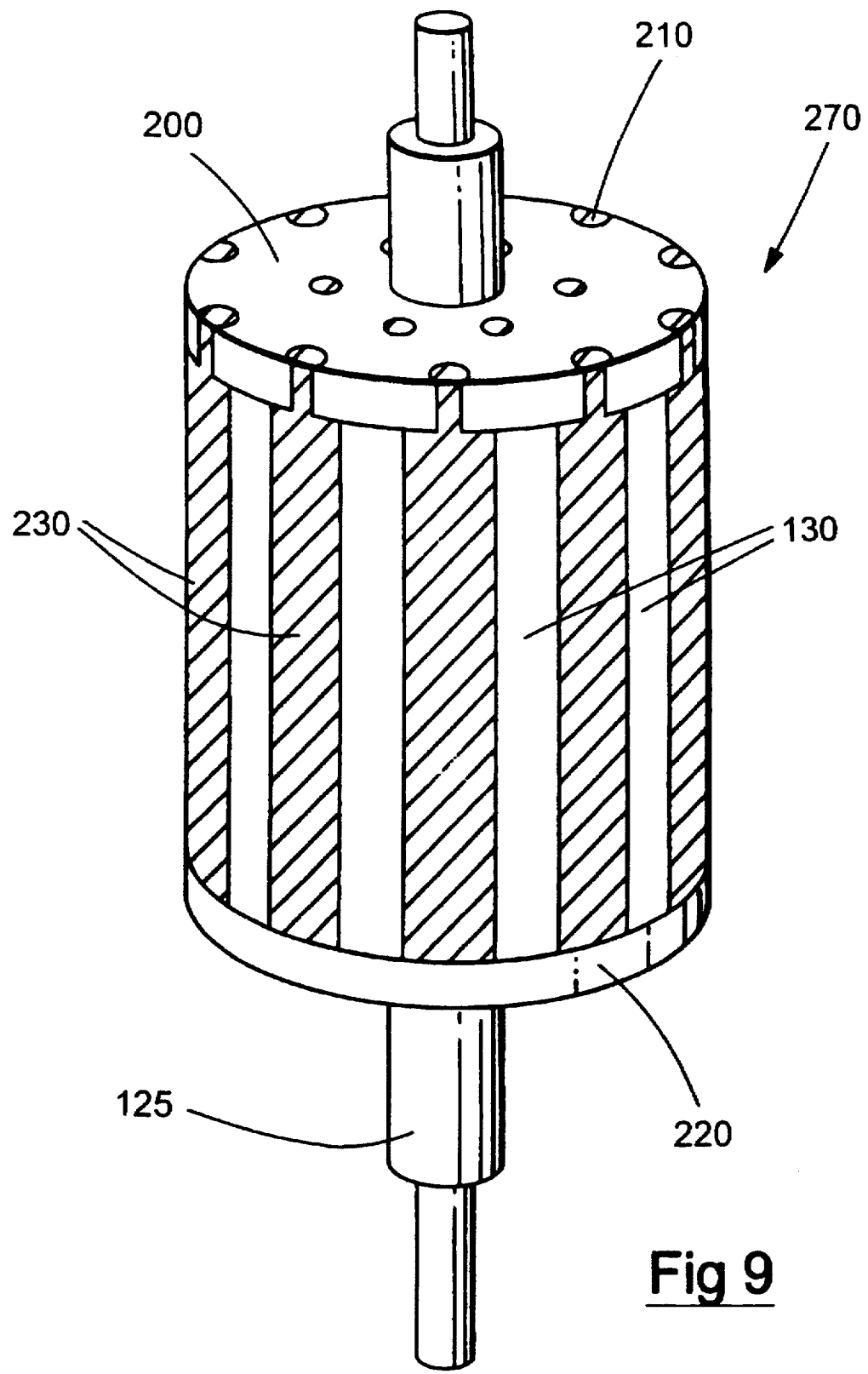
FIG. 9 shows a perspective view of the completed rotor.

Once the resin has been poured into the assembly, it is cured in an oven, and any excess resin is machined from the faces of the end caps. The rotor is then turned in a lathe, and cylindrically ground if necessary, to remove the outer periphery of the laminations to at least the radial depth of the rib 110, exposing the resin in the flux guides 140 and channels 150, as shown in perspective in FIG. 9. Referring again to FIG. 4 it will be seen that the flux barriers are terminated abruptly by the arcuate ribs. The angularly opposite corners, defined between the edge of the laminations defining the flux barrier and the radially inner edge of the rib are substantially at right angles in this embodiment. Other angles of corner are possible. These sharp corners result in clean edges on the magnetizable material of the stack laminations and the adjacent resin in the flux barrier space.

The opportunity can be taken to inspect these exposed resin-filled regions visually, since the presence of air bubbles would indicate inadequate and reduced strength casting. The bars of resin running axially along the rotor in spaces 140 and 160 act as retaining members increasing the mechanical rigidity of the assembled rotor.

It is possible to estimate the stress induced in each end cap rib when the rotor is rotating, the force produced being the vector sum of the radial and magnetic forces. A worst case estimate suggests that this stress is around 25% less than the tensile strength in shear of the resin for a rotor with a peripheral velocity of around 15 m/sec. This calculation ignores the adhesive properties of the resin when cured, which will serve to reduce the stress in the end-cap supports still further.

Referring now to FIG. 10, an alternative embodiment of a partially formed lamination 100' is shown. In the alternative embodiment, a plurality of flux guides 150' and flux barriers 140' are provided within each quadrant of the lamination, spaced radially from each other between the central hole 120' and an outer channel 160'. The hole 120' in the center is adjacent central flux guides 135' and has a keyway 180 formed in it. There is a rib 110' abruptly terminating each flux barrier which is subsequently removed in a manner similar to that described above with reference to the first embodiment of the rotor.

Employing a larger number of flux guides in a rotor improves the output of a motor constructed using such a rotor. Additionally, the mechanical strength is improved over the single flux guided rotor. This is because, as will be seen by reference to FIGS. 4 and 10, each individual flux barrier in a multiple flux guide rotor is radially narrower than that in a single flux guide rotor. Thus the cured resin in the flux barriers and the channel is more evenly distributed across the rotor in the former. In a multiple flux guide rotor, each resin-filled flux barrier 140 supports only the mass enclosed by it and the adjacent flux barrier 140 or channel 160. In a single flux guide rotor, however, the resin in the channel 160 must support the relatively large mass of the flux guide. It will be appreciated that the multiple flux guide rotor is constructed and machined in accordance with the method described above. The first end cap will, of course, have suitably altered sets of holes for admission of the resin.

FIG. 11 shows a section through the motor 300 including a rotor 270' formed from a stack of the laminations 100' of FIG. 10. The motor 300 consists of a stator 310 and a rotor 270'. The rotor is mounted on a shaft and is of a diameter slightly smaller than the internal diameter of the stator 310. There is thus an air gap 320 between the rotor and stator.

The stator is based on a conventional reluctance motor stator. The coils which are energized to create the wave of MMF are located in slots 330 formed in the inner circumference of the stator. In the stator shown in FIG. 11, there are 36 equi-spaced slots and the stator slot-pitch is thus 10°. The coils are wound concentrically such that the axis of the resulting phase MMF's are separated by 120 electrical degrees in space, as will be familiar to those skilled in the art.

It is common in the manufacture of laminations for electrical machines to arrange that the rotor lamination is formed from the piece of material punched from the center of the stator lamination. This reduces material cost.

To reduce further the production cost of the rotor of the present invention, a discontinuous rib could be formed on the outer periphery of the rotor when the laminations are punched. The rib would provide support only for the flux-guides and would thus fit into the space occupied by the slot opening of a stator. This in turn would allow the rotor laminations to be cut from the stator laminations, saving on lamination material.

While the invention has been described in connection with the illustrative embodiments discussed above, those skilled in the art will recognize that many variations may be made without departing from the present invention. For example, the invention is equally applicable to forming a rotor for a synchronous machine arranged to run as a generator or a motor. Also, while a four pole rotor and a three-phase wound stator are described, the invention is equally applicable to other numbers of rotor poles and phases. The present invention is intended to be limited only by the spirit and scope of the following claims.

What is claimed is:

1. A method of forming a rotor for a reluctance machine, the method comprising:

(a) making a stack of laminations, each lamination comprising magnetizable material defining flux guides and adjacent flux barriers, the flux guides and flux barriers being arranged to define rotor pole regions angularly spaced about an axis, each flux barrier extending between a corresponding first one of the rotor pole regions and an angularly adjacent second one of the rotor pole regions, the magnetizable material further defining a rib spanning each of the flux barriers at the periphery of the lamination;

(b) introducing a settable non-magnetizable and electrically non-conductive filler into the flux barriers;

(c) turning the stack about the axis; and (d) removing material from the periphery of each lamination at least to the radial depth of the rib, thereby removing the rib from each lamination of the stack, the settable filler holding the arrangement of flux guides and flux barriers in their relative positions.

2. A method as claimed in claim 1, in which the filler is a settable material.

3. A method as claimed in claim 1, including mounting a first end cap on one end of the stack and thereafter introducing the filler.

4. A method as claimed in claim 2, including mounting a first end cap on one end of the stack and thereafter introducing the filler.

5. A method as claimed in claim 3 in which the first end cap defines a gallery through which the flux barriers are intercommunicating.

6. A method as claimed in claim 4 in which the first end cap defines a gallery through which the flux barriers are intercommunicating.

7. A method as claimed in claim 3, including mounting a second end cap on the other end of the stack, the second end cap having holes in registry with the flux barriers for admitting the filler.

8. A method as claimed in claim 4, including mounting a second end cap on the other end of the stack, the second end cap having holes in registry with the flux barriers for admitting the filler.

9. A method as claimed in claim 5, including mounting a second end cap on the other end of the stack, the second end cap having holes in registry with the flux barriers for admitting the filler.

10. A method as claimed in claim 6, including mounting a second end cap on the other end of the stack, the second end cap having holes in registry with the flux barriers for admitting the filler.

11. A method as claimed in claim 3 in which the first end cap forms part of a mold into which the stack is received for injection of the filler.

12. A method as claimed in claim 4 in which the first end cap forms part of a mold into which the stack is received for injection of the filler.

13. A method as claimed in claim 5 in which the first end cap forms part of a mold into which the stack is received for injection of the filler.

14. A method as claimed in claim 6 in which the first end cap forms part of a mold into which the stack is received for injection of the filler.

15. A method as claimed in claim 7 in which the first end cap forms part of a mold into which the stack is received for injection of the filler.

16. A method as claimed in claim 8 in which the first end cap forms part of a mold into which the stack is received for injection of the filler.

17. A method as claimed in claim 9 in which the first end cap forms part of a mold into which the stack is received for injection of the filler.

18. A method as claimed in claim 10 in which the first end cap forms part of a mold into which the stack is received for injection of the filler.

19. A method as claimed in claim 1, including forming an end cap of the filler on each end of the stack.

20. A rotor for a reluctance machine, the rotor being produced by a method comprising:

(a) making a stack of laminations, each lamination comprising magnetizable material defining flux guides and adjacent flux barriers, the flux guides and flux barriers being arranged to define rotor pole regions angularly spaced about an axis, each flux barrier extending between a corresponding first one of the rotor pole regions and an angularly adjacent second one of the rotor pole regions, the magnetizable material further defining a rib spanning each of the flux barriers at the periphery of the lamination;

(b) introducing a settable non-magnetizable and electrically non-conductive filler into the flux barriers;

(c) turning the stack about the axis; and (d) removing material from the periphery of each lamination at least to the radial depth of the rib, thereby removing the rib from each lamination of the stack, the settable filler holding the arrangement of flux and guides and flux barriers in their relative positions.

21. A method as claimed in claim 1, wherein the rotor is formed such that the machine can be operated substantially free of adverse effects associated with a conducting cage.

* * * * *